United States Patent
Amendola

[11] Patent Number: 5,804,329
[45] Date of Patent: Sep. 8, 1998

[54] ELECTROCONVERSION CELL

[75] Inventor: Steven Amendola, Ocean, N.J.

[73] Assignee: National Patent Development Corporation, New York, N.Y.

[21] Appl. No.: 579,781

[22] Filed: Dec. 28, 1995

[51] Int. Cl.$^6$ ...................................................... H01M 4/58
[52] U.S. Cl. ............................ 429/34; 429/41; 429/105; 429/210
[58] Field of Search .................................. 429/105, 101, 429/41, 34, 12, 210

[56] References Cited

U.S. PATENT DOCUMENTS

| | | |
|---|---|---|
| 2,876,179 | 3/1959 | Birdwhistell et al. . |
| 3,033,766 | 5/1962 | Schechter . |
| 3,562,019 | 2/1971 | Spahrbier . |
| 3,892,592 | 7/1975 | Fukuda et al. . |
| 4,397,925 | 8/1983 | Magahed . |
| 4,492,741 | 1/1985 | Struthers .............................. 429/105 X |
| 4,808,282 | 2/1989 | Gregory . |
| 5,298,037 | 3/1994 | Murphy et al. . |

OTHER PUBLICATIONS

"Derwent Information Limited" 1963 Thru Weekly Update 9547/UP, 9547/UPEQ, 9542/UPA, 9536/UPB; WPI 9544/UPEQ, dated Dec. 1, 1995 (87 pages).

Search on Articles "Systems:OS Dialog OneSearch" dated Dec. 1, 1995 (62 pages).

Primary Examiner—John S. Maples
Attorney, Agent, or Firm—Fish & Richardson P.C.

[57] ABSTRACT

Boron redox species can provide electrochemical cells for battery or energy storage systems that are characterized by favorable specific energy, energy density, capital and operating cost, recharge efficiency, safety, environmental impact, serviceability and longevity.

69 Claims, 8 Drawing Sheets

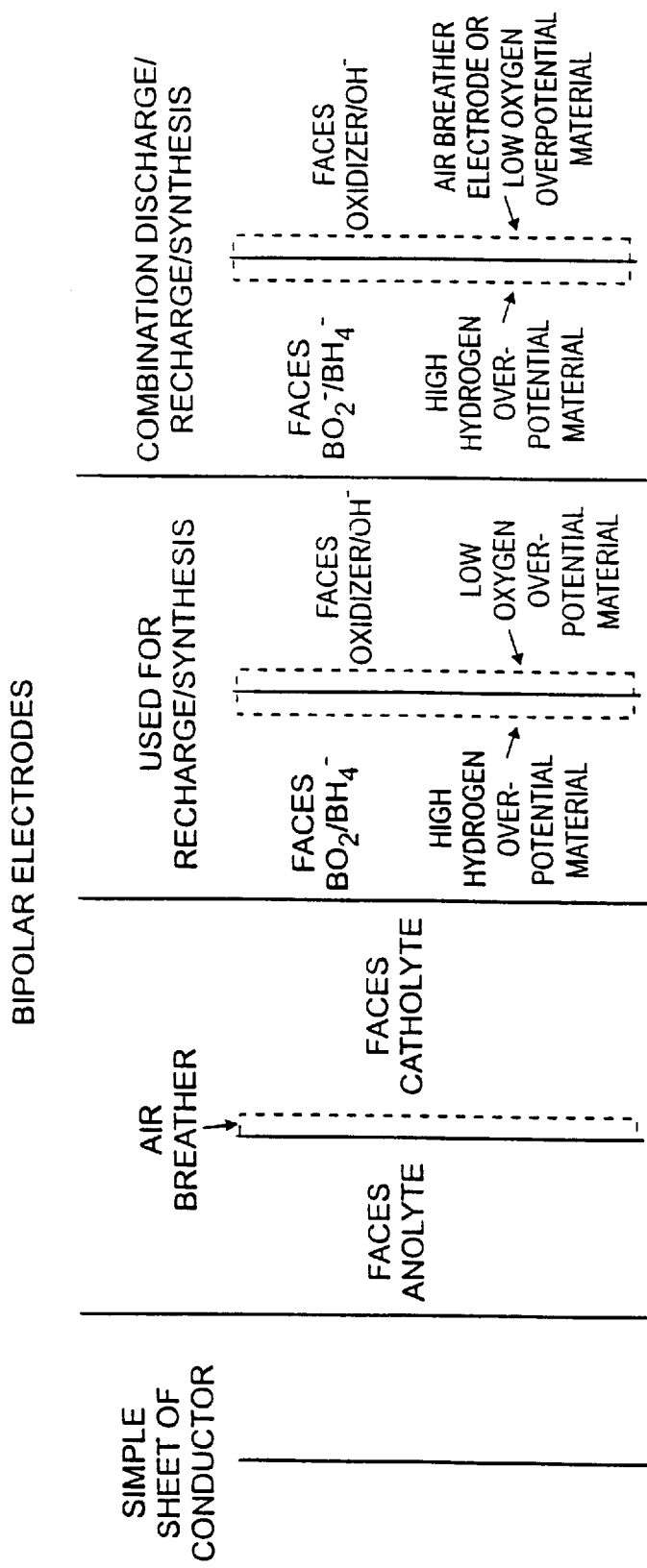

ELECTROCONVERSION CELL

FIELD OF THE INVENTION

This invention is in the general field of electrochemical conversion, using, for example, electrochemical cells.

BACKGROUND OF THE INVENTION

Pressing requirements for clean transportation, load leveling of electric utilities, as well as many other electrochemical applications have promoted significant research for new electrochemical cells. Energy density, cost, cycle life, recharge efficacy, safety, environmental effects, and serviceability are among the factors to be considered in producing a battery suitable for practical use in many applications.

The ability to convert chemical to electrical energy and back again has been well known for almost two centuries. However, certain applications, such as electric vehicles, have requirements for energy density, low cost, and long cycle life which are difficult to meet when constructing commercially practical cells that are operable and safe. For example, a high theoretical energy density (see the discussion of this term below) may in some cases be associated with increased weight of the components, thereby undercutting the theoretical advantages.

SUMMARY OF THE INVENTION

I have discovered that the use of boron redox species can provide an electrochemical cell with a favorable balance of characteristics, such as available energy, energy density, capital and operating cost, recharge efficiency, safety, environmental impact, serviceability and longevity.

Accordingly one aspect of the invention generally features an electrochemical storage medium comprising a carrier mixed with a reduced boron-containing compound (preferably borohydride), the reduced compound being oxidizable to an oxidized boron-containing compound (preferably borate or polyborates in non-aqueous systems using a halogen containing reducing agent, borontrichloride may be produced) concurrent with the generation of an electric current when the storage medium is in electrical contact with an electrode that carries current generated during that oxidation. The carrier may be an aqueous or a non-aqueous solution, e.g., a liquid that dissolves the reduced compound and contacts the electrode so that the reduced boron-containing compound can provide electrons directly to the electrode, rather than indirectly through a stable intermediate such as hydrogen. Preferred non-aqueous liquids include anhydrous ammonia; dimethylformamide; dimethylsulfoxide, amines; non-amine organic bases; alcohols; alkene carbonates; and glycols; specific liquids include tripropylamine; pyridine; quinoline; triethanolamine; monoethanolamine; ethylene glycol; propylene glycol; methanol; ethanol; ethylene carbonate; and propylene carbonate. The non-aqueous solution may include a solubilizer or a conductivity enhancer, such as EDTA, crown ethers, cryptates, and quaternary ammonium salts.

In another aspect of the invention, the storage medium is positioned to be the anode of a battery, which includes an anode and a cathode in electrical communication. The reduced compound is oxidizable to an oxidized boron-containing compound concurrent with the discharge of the battery, e.g., when the reduced compound contacts the electrode and delivers electrons to it. Available air may be the oxidizing agent, or the battery may include an oxidizing agent, such as: $O_2$; compounds comprising oxygen and a halogen; and $X_2$, where X is a halogen. Preferred agents are: perchlorate ($ClO_4^-$), chlorate ($ClO_3^-$), chlorite ($ClO_2^-$), hypochlorite ($OCl^-$), chlorine ($Cl_2$), bromine ($Br_2$), bromate ($BrO_3^-$), iodate ($IO_3^-$) or other comparable halogen/oxygen compounds. Other preferred agents are those which contain elements that may easily change between two or more oxidation states, in general, starting in the higher state. These compounds may or may not be soluble in the carrier medium, and they may be used as a solution, slurry, paste, gel or any other desired form. Preferred agents include: a) $[Mn(VII)O_4]^-$ (e.g., sodium permanganate); b) $[Fe(VI)O_4]^{-2}$ (e.g., sodium ferrate); c) $Ce(IV)OH(NO_3)_3$ (basic cerium nitrate); d) $[Ce(IV)(NO_3)_6]^{-2}$ (e.g., as ammonium cerium nitrate); e) $[Fe(III)(CN)_4]^{-3}$ (ferricyanide); f) $[Cr(VI)O_4]^{-2}$ (chromate); g) $[Sn(IV)O_3]^{-2}$ (stannate); h) $[Bi(V)O_3]^-$ (bismuthate); i) $Mn(IV)O_2$; j) $Ag(I)_2O$; k) $Ag(II)O$; l) $Ce(IV)O_2$; m) $Pb(IV)O_2$; n) $Ni(III)O(OH)$; o) $Ni(IV)O_2$; p) $Co(III)O(OH)$; q) $[N(V)O_3]^-$ (e.g., ammonium nitrate, sodium nitrate, lithium nitrate, calcium nitrate); r) $[NO_2]^-$ (e.g., sodium nitrite); s) $[S_2O_8]^{-2}$ (e.g., ammonium or sodium peroxydisulfate); t) compounds containing Cu(III), Tl(III), Hg (II), Se (VI), or Te(VI); or u) $R(NO_2)_n$ where R is an alkyl, aryl, or arylakyl organic group and n=1–6 (e.g., mono- or poly- or pernitro organic compounds). Note that valeneces are supplied simply to aid in understanding the nature of the oxidizing agents, but not necessarily as a claim limitation. Still other oxidizing agents are trinitrobenzoic acid, hexanitrobenzene, or trinitrobenzene.

The anolyte and catholyte of the battery may be separated by a permiselective membrane, such as an anionic membrane, a cationic membrane, or a bipolar membrane. The cathode may be an air breathing cathode, e.g., with a catholyte which can be oxidized by air (e.g., in basic solution) to produce an agent that then oxidizes borohydride to borate with the generation of electrical current, preferably in a cycle that includes regenerating the catholyte after it has generated electricity by oxidizing the borohydride, thus allowing its reuse. For example, the catholyte can contain iodate ($IO_3$); ferricyanide and ferrocyanide; chromate and Cr+3; manganese at valence +2 and +3; tin at valence +2 and +4; Cobalt at valence +2 and +3; a catalyst to aid the reoxidation of the oxidation agent to the higher oxidation state by air. The battery may include a chamber separate from the cathode compartment in which reoxidation of the catholyte takes place. The battery may include two units, one that is the direct air breather, and another unit which comprises a catholyte which can be oxidized by air and can then oxidize borohydride to borate with the generation of electrical current using air indirectly. The battery may also include a bipolar electrode. It may have external storage tanks for storage of the anolyte, the catholyte, or both the anolyte and the catholyte. The cell to generate electricity by oxidation of borohydride may be physically separated from the cell to generate the borohydride from the borate, or it may be the same cell as that used to generate borohydride from borates. A controller may be connected to at least one source of a reactant, to determine the transport of the reactant to the anode or the cathode, and a monitor which determines a battery characteristic and produces a signal to the controller in response to monitored values of the characteristic. For example, at least one probe responds to a characteristic selected from, conductivity, voltage, current and power output, ion concentration, pH, index of refraction, colorimetric, (chemical oxygen demand), turbidity, density to generate an input signal, the input signal being transmitted to an electronic processor, the processor being connected to the controller which controls flow into a battery compartment. The battery electrode may include a conductive substrate such as stainless steel which is coated. Electrodes that are particularly useful (e.g., to avoid generating hydrogen) include a) an alloy of bismuth, thallium, cadmium, tin, gallium, lead or indium; b) mercury or mercury amalgamated with other metals or mercury coated on a conductive substrate; c) tellurium or tellurides. The electrode may include additional materials to improve corrosion resistance or other properties of the electrode. The may be a bipolar electrode having two sides, one of the sides being coated with said substance, and a second side being coated with a material of low oxygen overvoltage such as gold, or iridium oxide; alternatively the second side is a standard air breathing electrode. The bipolar electrode comprises a sheet of conductive material, such as stainless steel or gold plated copper, or another appropriate metal. The electrode may have a smooth or high surface area of foam metal or tubes, cylinder, fibers, or another geometric shape, powder, coated or uncoated catalyzed or uncatalyzed.

Batteries as described above may be configured as a sealed unit of physical size and shape and correct voltage range to meet form fit and function specifications of a standard battery for a consumer electronic or electrical device. e.g, a button for a hearing aid; AAA; AA; A; B; C; D; 9 volt; a computer battery; a cellular phone battery. Also, the battery may be characterized by voltage and current production suitable for ignition and starter motor operation in a vehicle powered by an internal combustion engine, or it may be suitable for installation on a vehicle that uses electricity either partially or entirely to propel the vehicle. The battery may also be suitable for storage of electricity for applications such as electric utility load leveling and other means of storage of electricity. This aspect of the invention also features generating a current over time by connecting the battery to a load, in which case the current is generated by oxidation of the reduced boran-containing compound. The battery may be recharged by applying an electrical potential to the anode to regenerate borohydride anion from borate anion. Alternatively, discharged anolyte solution may be replaced with anolyte comprising borohydride anion suitable for oxidation to borate anion.

Another aspect of the invention features synthesizing a borane ion (borohydride) by electrical reduction of borate ion, e.g., as a method of recharging a battery. The synthesis may be monitored using of a probe which generates an electrical signal representative of a characteristic selected from ORP, conductivity, voltage, current and power input, ion concentration, pH, index of refraction, colorimetric, COD, turbidity, density, said signal being transmitted to an electronic processor, the processor being connected to the controller which controls flow into a battery compartment which is connected to a regulate flow into each compartment, e.g., via pumps, valves and other appropriate conveyances. Typically, the borate and borohydride ion are in an aqueous carrier. The cathode of the cell can be an electrode of high hydrogen overpotential, the reduction of borate ions being accomplished by applying a potential to an electrode which may be comprised of an alloy of bismuth, thallium, cadmium, tin, lead, gallium and indium. Alternatively, the electrode for application of a potential is comprised of mercury or mercury amalgamated with other metals or mercury coated on a conductive substrate. The electrode may also contain tellurium or tellurides. Such electrodes inhibit the release of hydrogen gas while current is passed through. Electrode additives to improve characteristics such as corrosion resistance may be added. Other highly reduced species (in addition to borohydride) may be recovered, e.g., species comprising metals or compounds from aqueous and/or non aqueous systems. As before, in this method, a bipolar electrode may be used; also, a permiselective membrane maybe used, e.g., an anionic membrane, a cationic membrane, or a bipolar membrane. Oxygen may be released from an anode while producing borohydride in a catholyte. An oxidized species may be produced as a product in an anode chamber. Non-borohydride boranes may be produced by adding partial reduction adducts or other adducts to the catholyte, such as cyanide ion, amide ion, halide ions, and pseudohalides.

In yet another aspect, the invention generally features transporting a borohydride anion from a generation point to a consumption point, by applying an electrical potential to a solution of oxidized borohydride at the generation point to produce borohydride in a first cell and transporting the borohydride solution to the consumption point where the borohydride is provided for oxidization in a second cell. Also, spent solution comprising oxidized borohydride may be transported from the consumption point to the generation site and applying the electrical potential to the spent solution at the generation point to produce borohydride in the first cell. The resulting borohydride may be used as described above. Alternatively, it may be combined with water to generate hydrogen by reduction of water, e.g., catalyzed by the presence of transition metal compounds such as a cobalt (II) compound (e.g., cobalt(II)hydroxide). The hydrogen may be collected and transported to a hydrogen consumption point, e.g., an industrial hydrogen user. The oxidized borohydride solution may be transported back to the generation point to be reused for generation of borohydride.

This system may be used with cells that are configured to be suitable for installation on a vehicle that uses electricity either partially or entirely to propel the vehicle, or they may be used for storage of electricity for applications such as electric utility load leveling and other means of storage of electricity. In short, this aspect features a system of transporting borohydride as a method of transporting energy to a given location, e.g., a system of transporting and distributing borohydride such that vehicles that operate with borohydride may fill up with fresh borohydride and discharge the borates. The borate solution is converted to borohydride solution with a cell for synthesizing borohydride, e.g., for recharging a battery, by electrical reduction of borate ion.

The system benefits from the very high energy of electrode couples based on the use of borohydrides at the anode. Additionally, the system is versatile because the reactants can be used in a wide variety of chemical environments, for both secondary and primary cells. "Secondary" refers to the ability to recharge the cell and "primary" refers to a system where the original reactants are used only once and not regenerated by a charging reaction. Another feature that provides versatility is the solubility of reactants in water or other solvents, enabling configurations in which the reactants are flowed through a cell or kept stationary in a paste or gel or solution.

The reactants may be varied to include a wide variety of oxidizing agents for the cathode of the battery, including oxygen which may be taken in from ambient air. This flexibility allows many configurations from low power-long life to high power-long life as needed. The ability to store liquid fuel external to the cell is key to providing a long range system where electrode area is independent from the total energy stored, for example, in applications such as utility load leveling and automotive transportation. The spent liquid can be rapidly exchanged for fresh liquid instead of actually having to recharge the system using electricity.

The term "Electroconversion Cell" includes operation either to convert electricity to chemicals or chemicals to electricity and operation as either a primary cell or a secondary cell or a fuel cell or a synthesis cell or any combination of the above.

DEFINITIONS

Cell refers to any electrochemical system whether producing or consuming electricity and/or producing and consuming chemicals. Battery refers to any combination of cells used to produce electricity. Primary cell refers to a cell designed to deliver electricity but not to be recharged. Secondary refers to a cell that can both deliver electricity and be recharged. Fuel cell refers to a cell that generates electricity by consuming "fuels" such as hydrogen, hydrazine or methanol with oxygen and generally will produce electricity as long as fuels are supplied but does not reverse its function to recharge or produce the materials that it has consumed. As noted, Electroconversion Cells refers to cells defined below having the ability to function in one or more of several modes.

In the following equations, references to a voltage ($E^0$ or $E^{1/2}$) imply standard conditions and are provided for calculations only. Cells that operate at conditions (including concentrations, temperatures and pressures) other than standard will exhibit different voltages. Nothing about the voltage listed should be considered in any way as limiting the rich variety of cells and battery combinations offered by the Electroconversion Cell, nor does the listing imply past or future actual attainment of the listed voltage. $E^0$ refers to the voltage of a complete reaction and $E^{1/2}$ refers to a half reaction which occurs in one part of a cell while another half reaction must be occurring in the cell as well.

"Electrode" is a very broad term and refers to a conductive material that conducts electrons in or out of a cell. Anodes and cathodes are both electrodes. Bipolar electrodes (one side is the anode the opposite side is the cathode to an adjacent cell) are electrodes. Electrodes can be solid or liquid. Air breathing electrodes must interact with a gas as well. In recent years a very wide variety of electrodes has become available. Electrodes may be as simple as a sheet of steel or may be a "foam metal" or colloidal, or a powder. Electrodes can be almost any shape including sheets (plates), tubes, cylinder, cubes, spheres or almost any shape that can be designed for a given purpose. They may have many characteristics, porous, non-porous, flow through, scavenger and on and on. While any number of these electrode types are useable in the Electroconversion Cells to obtain a desired result, none is specifically required to utilize the electrochemistry as revealed in this invention. Therefore, whenever electrodes are mentioned, any configuration of electrodes used in a real battery or cell that utilizes the chemistry as disclosed herein is considered as an embodiment of this invention.

When a cell is operating to discharge and thereby produce electricity the electrode that interacts with the "fuel" that gets oxidized is called the anode. The liquid in this chamber is called the anolyte. The other half of cell has an electrode called a cathode and the solution in this chamber is called the catholyte. In a cell with no barrier to maintain different chemistries (such as the common lead-acid battery) the anolyte and catholyte are one in the same (in the lead-acid battery it is sulfuric acid) and is often simply called the electrolyte. In any event electrolyte as used herein will refer to any conducting liquid or suspension in any function.

When a battery is being recharged, electricity is being put into the cells. Under these conditions the components functions reverse and the anode is now the cathode and visa versa.

An alternative nomenclature is to call the anode of the discharging cell the negative electrode. Indeed electrons flow out of this side of the battery and travel through the load to the positive side of the battery. During recharge electrons flow into the negative electrode and this designation does not change based on whether the battery is charging or discharging.

Energy is used in units of watt-hours (wh) or kilowatt hours (kwh) or kilojoules (kJ). Power is used in units of watts (w) or kilowatts (kw). Energy density refers to an amount of energy available from a certain volume of cell or material, expressed, for example as watt-hours per liter (wh/l) or in kilowatts per liter (kwh/l). Specific energy refers to energy available from a certain mass of cell or material, expressed as watt-hours per kilogram. (wh/kg) or kilowatts per kilograom (kwh/kg). Energy density and specific energy are related to each by the density of the material or system. Specific power refers to the amount of power available per unit weight usually in watts/kg. A sparger is a device that facilitates gas/liquid contact, for example, a device with fine pores that breaks up a gas flow into very fine bubbles to achieve a very high surface area interface with a liquid.

The inventor uses a unit of his own definition: the Volt-Faraday ("V-F"). This V-F unit is found by multiplying the voltage of a reaction by the number of electrons participating in the reaction. It is a quick way to determine available energies for batteries. Thus, 37.31 V-F equals one kilowatt-hour (1000 watt-hours); one V-F equals 26.8 watt-hours.

In many examples the inventor calculates the theoretical energy density or theoretical specific energy. These are for comparison purposes and should not be construed as being achievable in any real battery system. Nor should any such number be considered as a requirement for any embodiment of the Electroconversion Cell. Theoretical calculations do not take into account any containers, electrodes, pumps or any auxiliary gear that may be required to make a real cell. Such calculations are useful to predict at the outset whether a particular chemistry has even a theoretical chance of achieving a certain goal.

Other embodiments will be apparent to those skilled in the art from the following description of the preferred embodiments and from the claims.

BRIEF DESCRIPTION OF THE DRAWINGS

FIGS 8A–8D are diagrammatic representations of various types of bipolar electrodes. electrochemical cells.

DETAILED DESCRIPTION OF THE INVENTION

Figure 1:
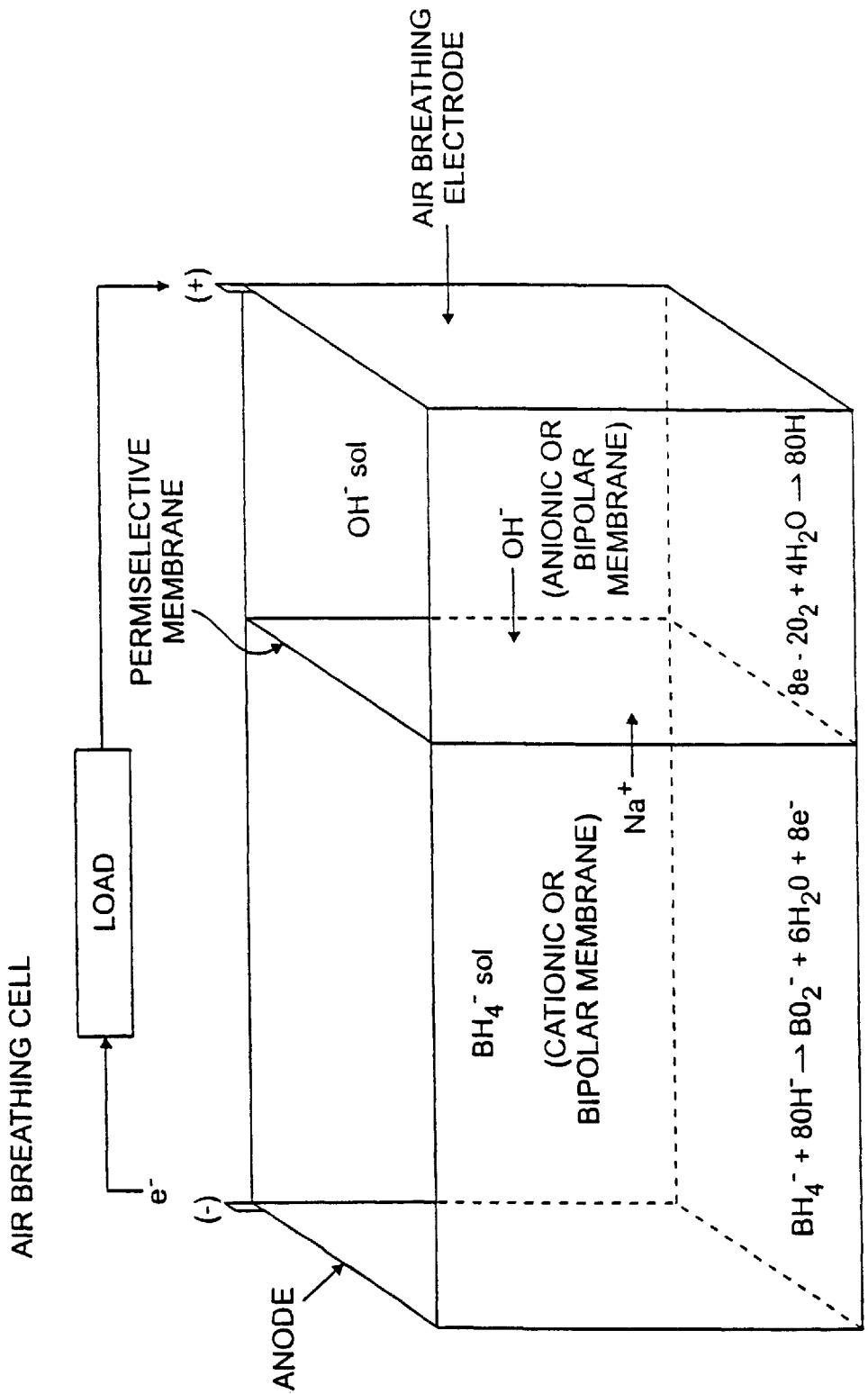
FIG. 1 is a diagrammatic representation of a battery having a borohydride-using anode and an air-breathing cathode.

The key half reaction which defines the fuel side (anode or negative) of the cell is based on borohydride ions. The reaction is $$BH_4^- + 8\, OH^- \rightarrow BO_2^- + 6\, H_2O + 8e^- \quad E^{1/2}=1.24V \tag{1}$$

Equation (1) above is written for an aqueous system but is not limited to such a system. One embodiment of the Electroconversion Cell would use an air breathing electrode to provide the other half-cell reaction required to make a complete cell. This reaction is $$2\, O_2 + 4\, H_2O + 8\, e^- \rightarrow 8\, OH^- \quad E^{1/2}=0.401V \tag{2}$$

The net reaction for equations (1) and (2) is found by adding the two reactions to get $$BH_4^- + 2\, O_2 \rightarrow BO_2^- + 2\, H_2O \quad E^0=1.641V \tag{3}$$

Borohydride ion is stabilized by hydroxide ions. The solution can release hydrogen gas if catalyzed or acidified. Therefore, in battery applications, gas releasing conditions are to be avoided. Release of hydrogen gas is undesirable because it can in some circumstances lower the energy available and cause a variety of other undesirable characteristics for the cell as described herein. Therefore materials to be in contact with the sodium borohydride solution should be chosen to avoid gas releasing reactions. Other factors to be considered are pH and the presence of material that may catalyze borohydride decomposition. The presence of hydroxide ions (high pH) is desirable, and exogenous hydroxide ions (such as sodium hydroxide) will typically be added in varying quantities as required for a stable system and desired conductivities for any given application. Other materials may be added to enhance the conductivity or other attributes of the cell.

The Gibbs Free Energy referred to as "delta G" for equation (3) is 1,270 kJ/mole of reactants. Oxygen is derived from the air and the molecular weight of sodium borohydride (any borohydride salt such as lithium or ammonium, etc. is useable as a source of borohydride with appropriate considerations for the nature of each material) is 37.83 grams per mole. Therefore, the energy available from one pound of sodium borohydride is 15,200 kJ/pound or 33,500 kJ/Kg. Sodium borohydride is soluble in water to about 44% by weight and therefore a saturated solution of this salt would contain 14,700 kJ/Kg or since the density of this solution is 1.25 gm/ml the energy available from the solution would be 18,400 kJ/liter. To convert these heat energy terms into electrical terms one kilowatt-hour equals 3,600 kJ so over 5.11 kwh per liter would be available at 100% efficiency. (In the units used by the Advanced Battery Consortium: 5,110 watt hours/liter). At higher temperatures greater solubilities of borohydride are possible and even higher energies would be available. In anhydrous ammonia the solubility is higher and even higher stored energies would be available if required.

As a quicker calculational method the inventor uses the unit he coined—"volt-faraday" hereinafter "V-F"—which is calculated by simply multiplying the voltage of the cell by the number of the electrons in the reaction. This method enables rapid sorting through available energies of various couples. One kilowatt-hour equals 37.31 V-F. By way of illustration the above system in equation (3) would give 1.641 V×8 Fardays of electrons=13.128 V-F per mole of reactants. This equals 347.0 V-F/Kg or for a 44% solution of density 1.25 equals 190.9 V-F/liter or 5.11 kwh/liter, the same as calculated above.

As an energy comparison, the theoretical energy available in a liter of gasoline is about 33,000 kJ. So a liter of this borohydride solution has about 56% of the theoretical energy available in a gallon of gasoline. Assuming that an electrochemical cell and an electric motor can convert energy to mechanical motion at 2.5 to 3 times the efficiency of an internal combustion engine, then ranges and power of the same order available from conventional automobiles will be available with an auto equipped with a borohydride based cell as described herein.

At the energy densities available from borohydride solutions, an electric utility theoretically could store one gigawatt-hour ($10^9$ watt-hours) of electricity in a 125,000 gallon tank. An electric car of normal weight using accessories such as air conditioning theoretically could travel over 300 miles with a 30 or 35 gallon tank. These predictions compare favorably with conventional lead-acid cells based on the reaction:

$$Pb + PbO_2 + 2\, H_2SO_4 \rightarrow 2\, PbSO_4 + 2\, H_2O \quad E^0=2.0V \tag{4},$$

which gives 4 V-F (it is a 2 electron reaction) for 642 grams of reactants (not counting the water required) or 6.23 V-F per kilogram or only 167 wh/kg. Solely on the basis of the theoretical chemistry, the borohydride system could provide considerably more energy than a lead-acid system.

As yet another point of comparison, the current mid-term goal for development of an advanced battery established by the United States Advanced Battery Consortium (USABC) is for an energy density between 100 wh/liter and 135 wh/liter and a specific energy of between 80 and 100 wh/kg. The long term goal of a battery useable in an electric vehicle would be 200 wh/Kg.

One of the many advantages of using a liquid fuel (anode) and electrolyte is that solid reactants that are usually in the form of plates may be eliminated. Since electrodes only need to be electron collectors a relatively simple and robust design can be achieved. Higher voltages can be achieved by connecting the necessary number of cells in series; alternatively, another method of achieving a series connection is to use what are known as bi-polar electrodes. In certain embodiments of the Electroconversion Cell, bi-polar electrodes can be simple sheets of the proper conductor. In other batteries where the electrode is also the fuel, a more complex design typically results.

Additionally, the electrode area can be designed to deliver the necessary power for the given application. If additional energy is required in a given application, the size of the storage for the borohydride source can be increased, rather than having to increase electrode area. In a rechargeable cell using a solution of borohydride, an external storage tank of appropriate size may be used to give the desired total energy storage requirements. This feature is especially useful in electric utility load leveling, electric automobiles and emergency electrical applications such as lighting or uninterruptable power supplies (UPS) as used in the computer industry just to name a few. In a cell where the borohydride is a paste or gel or in general not fluidly mobile such as cells for applications such as computers or toys or cell phones, etc., the chamber size may be increased to hold more borohydride and thereby increased stored energy.

All drawings are conceptual and not drawn to scale and are for illustrative purposes only.

In FIG. 1, the basic cell is shown with no moving parts and an air breathing electrode. Known air breathing electrodes or electrodes developed in the future generally may be used, if they are chemically compatible with the chosen electrolyte system. As can be seen the two half reactions simultaneously occur in the respective chambers separated by a permiselective ion exchange membrane. Several commercially available membranes which allow only certain ions to pass through are placed between the anode and cathode compartments. In the air breathing configuration an ion selective membrane is required to prevent the self discharge of the cell, as will occur with many air breathing type electrodes, which tend to have high surface area and catalysts to promote the reactions at sufficiently high rates to provide reasonable currents. Several commercially available membranes would be suitable for use in the Electroconversion Cell. Essentially the membrane can either be cationic, allowing only the transport of the cations (sodium, $Na^+$ in this case. Or they may be anionic allowing the transport of hydroxide ion but not borohydride. Bipolar membranes may also be used in any design that may require its use. Transport of borate ion (the product of discharge) would be acceptable in a non-rechargeable system or a rechargeable system that was able to recover borate from both fluid reservoirs. The cell will operate with either type of membrane and the specific application will determine the suitable membranes for that particular application. Certain applications may even dispense with the membrane if the borohydride is essentially not dissolved but suspended in a medium that prevents the transport of the borohydride to the air breathing cathode. In this embodiment if the borohydride "paste" or "gel" is made by suspension of the powder in a material that affords low solubility of borohydride. A conductive compound may also be added to enhance the over all conductivity. These cells may be manufactured to form batteries of almost any size and capacity for a given application. They can be rechargeable if the proper electrodes are used as specified later in this disclosure.

Figure 2:
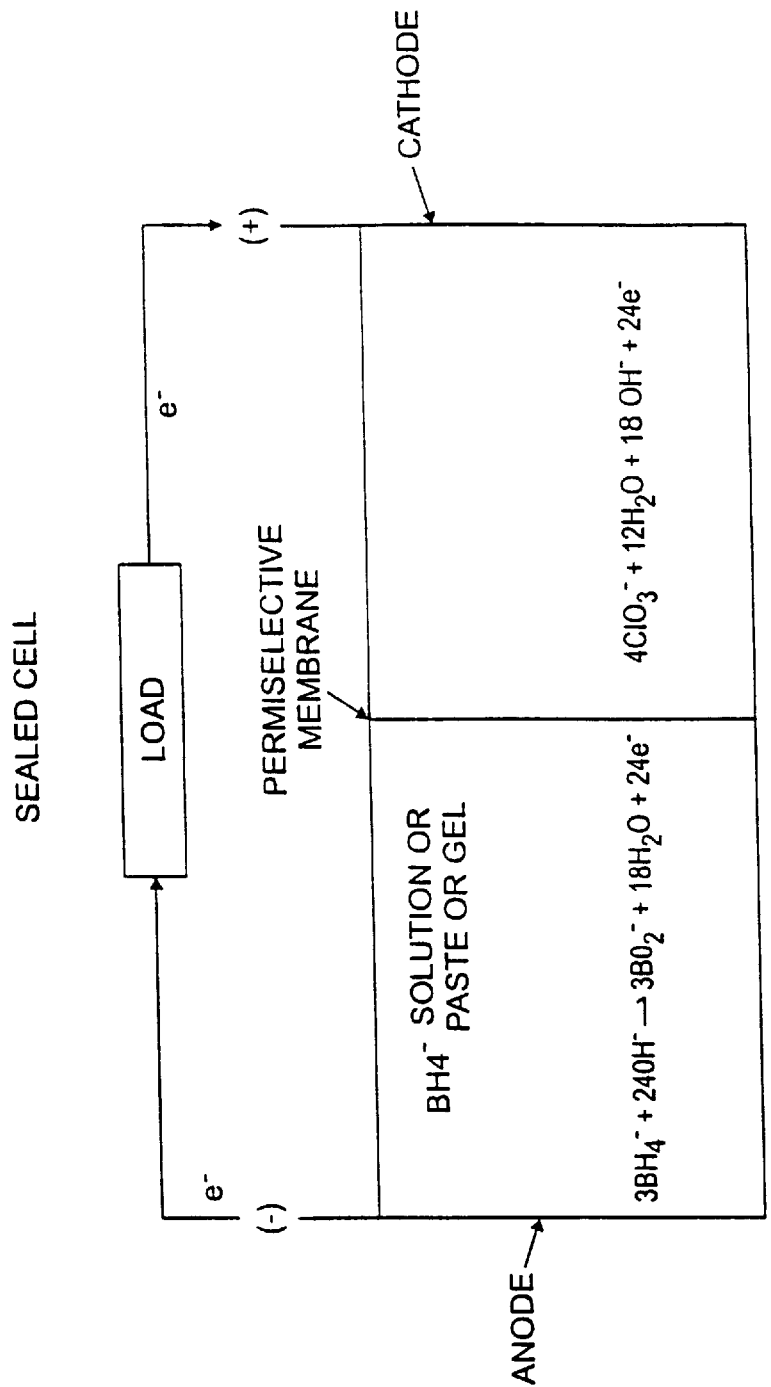
FIG. 2 is a diagrammatic representation of a battery having a borohydride-using anode and a cathode separated by a permiselective membrane.

In FIG. 2 the same type of cell as FIG. 1 is depicted but instead of the air breathing electrode the oxidizing agent is stored in the cell. This configuration lowers the theoretical specific energy considerably but still gives suitable specific energies. The embodiment in FIG. 2 may be used where a sealed cell is required or there is no air available. Most primary cells made today, which include 'C' or 'D' or 'AA' or 'AAA' or hearing aid type button batteries (among many others), fall into this category. Properly designed, these cells can also be made to be rechargeable. The Electroconversion Cell may operate as a normal primary battery or as a primary battery with borohydride flowing through the anode and an oxidizing solution flowing through the cathode.

In general the oxidizer used in the cathode compartment will contain oxygen in a form that can react with borohydride according to equation (1) to produce borates and electricity. The net voltage will depending on which oxidizer is chosen.

As an example in an aqueous system a highly soluble source of oxygen would be sodium chlorate or perchlorate. Under the predominantly basic conditions of the cell the half reaction would be (for chlorate)

$$ClO_3^- + 3\ H_2O + 6\ e^- \rightarrow Cl^- + 6\ OH^-\ E^{1/2} = 0.62V \quad (5)$$

With 4 units of equation (5) added to 3 units of equation (1) the following net equation is obtained

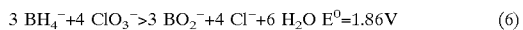

$$3\ BH_4^- + 4\ ClO_3^- \rightarrow 3\ BO_2^- + 4\ Cl^- + 6\ H_2O\ E^0 = 1.86V \quad (6)$$

The energy available is 1.86×24 Faradays=44.64 V-F per three moles of borohydride and four moles of chlorate. Assuming sodium salts, the total weight of this is 539.25 grams. This equals 82.78 V-F/Kg which equals 2.22 kwh/Kg. At roughly 40% concentration and density 1.25 the energy density would be nearer to 1.1 kwh/liter, still generally useful for current sealed batteries.

It is not essential that the oxidizer provide oxygen. Other chemistries are suitable. In basic aqueous systems borates will still dominate the products. So even if a halogen such as chlorine is used as an oxidizer the net reaction is

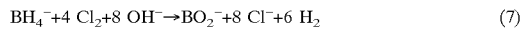

$$BH_4^- + 4\ Cl_2 + 8\ OH^- \rightarrow BO_2^- + 8\ Cl^- + 6\ H_2 \quad (7)$$

Figure 3:
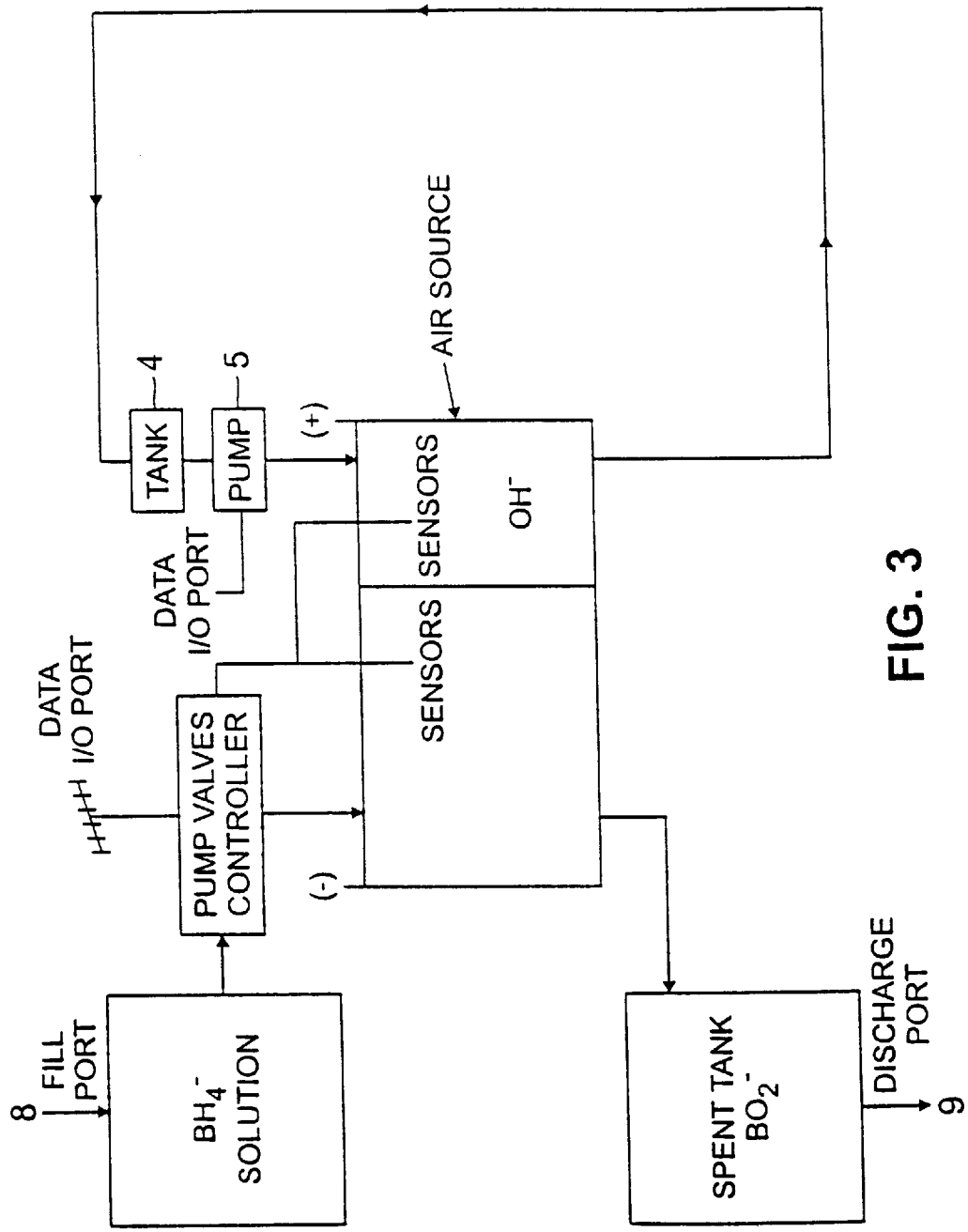
FIGS. 3–5 are diagrammatic representations of a batteries with flow-through reagents.

FIG. 3 shows the flow through configuration of the borohydride system with an air breathing electrode.

Additional oxidizing agents which would be suitable for a primary cell type configuration, whether flow-through or not, would include but are not limited to the following compounds or their solutions: oxyhalides, such as salts of chlorates, perchlorate, bromates, iodates, hypochlorates, etc. Typical compounds would be salts such as lithium perchlorate or sodium hypochlorite solution. Although ammonium perchlorate exhibits low solubility in water it is quite soluble in anhydrous ammonia.

Transition metal ions in higher oxidation states Permanganates and manganates. Mn(VI), Mn(VII) or Mn(IV) (such as manganese dioxide), ferrates (Fe(VI) or Fe (III)), or Chromates (Cr(VI)), nickel oxides (Ni(III)), tin (Sn(IV)), silver oxides, etc. may be used. Care must be exercised to insure that the material chosen does not catalyze the decomposition of borohydride as in equation (15), or to insure that direct contact between the material and borohydride is not permitted if catalytic action is possible. Typical compounds include sodium permanganate, sodium ferrate, potassium ferricyanide, sodium chromate, sodium stannate, etc.

Halogens or interhalogen compounds. These materials, when dissolved in aqueous base, form oxyhalide salts.

Nitrates and nitrites salts such as ammonium nitrate or sodium nitrite. These compounds are very soluble in water and exceptionally soluble in anhydrous ammonia.

Organonitro compounds: Nitrobenzoic or dinitro or trinitrobenzoic acids exhibit good solubility in hydroxide solutions, and they will form the corresponding amine and alcohol (i.e., nitrobenzoic acid will form aminophenol) Peroxydisulfates. Peroxydisulfates, such as ammonium or sodium peroxydisulfate, may be used. Since this anion does not transfer oxygen but only accepts electrons, the oxygen to form borates will come from hydroxide which must also be made available for the reaction. Due to the instability of peroxides to basic solution it is recommended for unusual applications.

The voltage for cells using a material from the above list, or other materials, can vary widely. When using compounds such as ferrates or peroxydisulfates or oxyhalides the total cell voltage can exceed 3 volts. Such systems help to maintain high energy densities. Several such systems would also be suitable for secondary cells, where the reduced species can be reoxidized electrolytically. Generally, the oxyhalides, transition metal ions, peroxydisulfates and some organonitrates can be reoxidized in such a secondary cell.

In FIG. 3, solution in tank 1 is pumped through cell 2 and discharged into tank 3 while drawing electricity out of cell 2. The pumping rate may be varied to handle varying demands on the cell, thereby providing a wide range of power levels for a given electrode area in the cell. Tank 4 and pump 5 are provided on the cathode side of the battery, and they match flows to maintain sufficient ion concentration near the electrode to maintain power output. Optionally, flow rates may be controlled by a computer (chip). Data from sensors via I/O devices which monitor conditions such as ORP or conductivity or other parameters can be the input that determines net flow.

In this configuration, as well as many others, the flexibility that is offered becomes apparent. What is created here has both the properties of a rechargeable battery and a fuel cell. This is very important for applications such as utility load leveling or electric vehicles which may need to make long trips without long recharges. But the option of recharging whenever that is desired is not sacrificed. In a typical fuel cell where the products are usually water and (sometimes depending on the fuel) carbon dioxide or nitrogen. In a fuel cell these are essentially considered electrochemical products of combustion and the products have no value for regenerating the original reactants. In the Electroconversion Cell the discharge product is useful for recovering the borohydride. Although water can be reconverted back to hydrogen and oxygen for a fuel cell and borohydride represents a method of storing hydrogen gas (as discussed later in this disclosure) the actual reaction taking place is that in equation (1). If the borohydride were catalyzed to release its hydrogen gas then a cell which has an anode that could catalyze the oxidation of hydrogen to water would be required. The theoretical reaction voltage would only be 1.23 V and the theoretical energy density would drop to about 3.8 kwh/l. The borate product would still have to be recharged in a separate cell at the higher voltage and the net cycle efficiency of the system of recovering useable electricity would decrease by at least 43%. (1.23 V/1.65 V ~75% and since 75% is the maximum efficiency of both the charge and discharge 75%×75%~57%:100%-57%=43%). Therefore, it is understood that the Electroconversion Cell is not simply a fuel cell or variant thereon but a truly new approach in electrochemical technology.

If a cationic membrane is used the necessary hydroxide ion for the anolyte can be added in the form of hydroxide. This technique lowers the overall specific energy. However some hydroxide should be available to help the kinetics of the two half reactions even though there is no net consumption. An anionic or bipolar membrane will allow the hydroxide produced in equation (2) to cross over and be available for reaction (1). As the cell is discharged the mass of the electrolytes increases due to oxygen intake. This mass is mostly transferred from the cathode to the anode compartment. It may also be physically delivered by pump or over flow from the cathode compartment to the anode compartment. If a cationic or bipolar membrane is used the sodium ions transport from the anode compartment to the cathode compartment to maintain charge balance during discharge. For this reason the tanks for holding the spent solutions should be larger than the storage tanks for the fresh solutions to accommodate the extra mass. During recharge the reactions are reversed. A separate recharge cell is envisioned as an option. This will allow optimizing the electrodes for the different chemical function that they perform during discharge and recharge. Additionally, conditions can be maintained so that the proper mass transfer occurs during recharge so there is no net migration of hydroxide or water over many cycles. However due to the open and flexible nature of the system a fresh fill up or a simple addition of the desired components would solve any imbalances that may occasionally occur.

In the configuration in FIG. 3, although the cell can be recharged by using electricity, the cell may also be recharged by draining tank 2 through port 9 and refilling tank 1 through port 8 with fresh borohydride solution. For an electric automobile this is equivalent to a "fill-up" on the road. So with this feature, rather than being limited by a power rate of recharge dictated by the available power, the liquids can be exchanged. The spent liquid could then be recharged in a external cell to regenerate the borohydride electrically. This solution could then be sold to other motorists. The station essentially charging for electricity plus a profit and not for borohydride per se. A smaller regenerating unit could also be set up at the home of a vehicle owner where just one or two extra charges of borohydride could be made available anytime that the owner did not have time to wait for a regular recharge.

Figure 4:
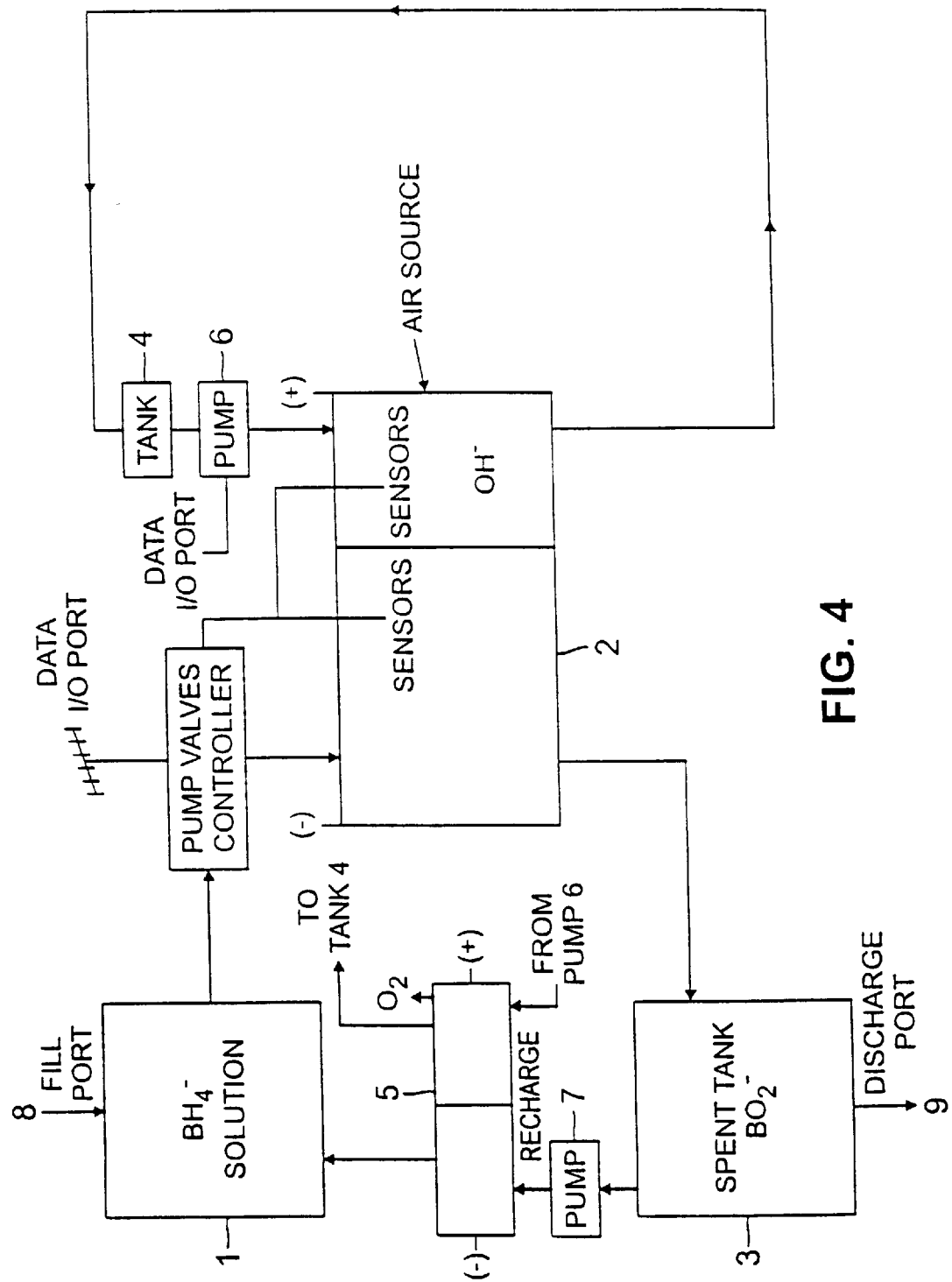
Figure 5:
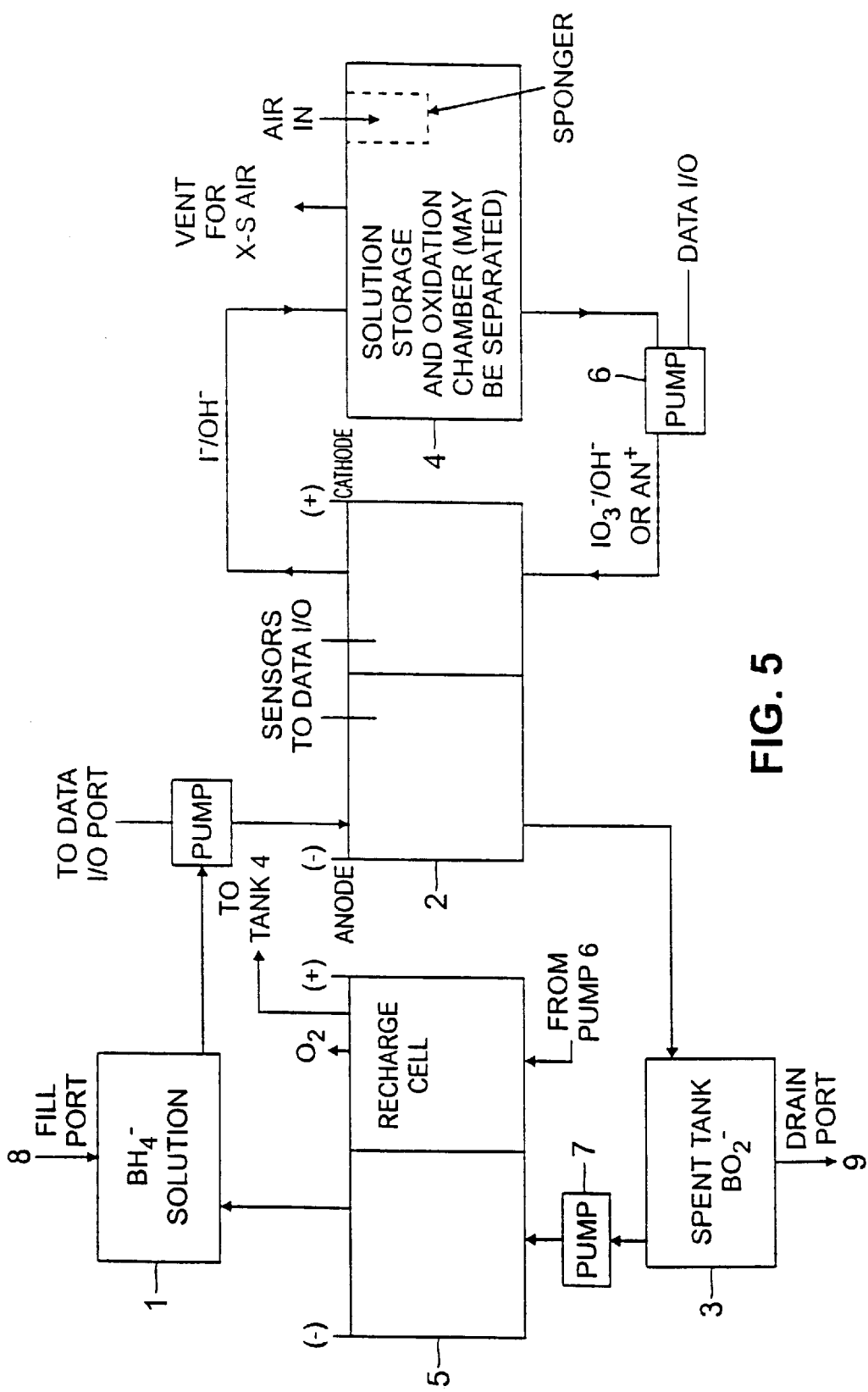

It should be noted that the electrochemical synthesis of borohydride from borate solution is a novel synthetic method for the production of borohydride. Therefore any references to recharging the cell also apply to the embodiment where a cell is operated for the purpose of manufacturing borohydrides. For efficiency, such regeneration preferably uses an electrode with high hydrogen overpotential. A system with relaxed design requirements is shown in FIG. 4 and 5, where recharging cell (5) is a separate cell from the charging cell. It should be noted that this recharging cell is equivalent to a cell for manufacturing borohydrides. Therefore any embodiments which refer to the recharging cell are also referring to an electrosynthesis cell. in this way the charging and discharging electrodes to be optimized for their respective functions. In other respects, FIG. 4 is the same system as FIG. 3, with a separate cell for the recharging.

FIG. 5 shows a cell in which a secondary electrolyte is circulated past an air sparger. The use of the secondary electrolyte avoids the use of an air breathing electrode which must act as both electrode and air disperser. The air is sparged into the electrolyte and oxidizes a species that is then sent to the cathode where the species is reduced. The reduced species is then returned to the sparging chamber to be oxidized again, completing the cycle. Any electrochemical couple that can be oxidized by air and then react in the cathode chamber to provide the oxidizing source for the borohydride may be used in this application. In this mode, to maximize the voltage of the cell, a couple should be chosen with a potential as close to oxygen as possible.

An example of the reaction sequence for the sparging configuration in FIG. 5 is as follows.

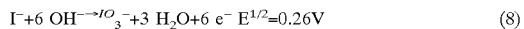

$$I^- + 6\ OH^- \rightarrow IO_3^- + 3\ H_2O + 6\ e^-\quad E^{1/2} = 0.26V \qquad (8)$$

Since equation (8) has a lower potential than equation (2), (the oxidation potential of oxygen in basic solution) the net reaction below will proceed in the chamber where the air is admitted.

$$2\ I^- + 3\ O_2 \rightarrow 2\ IO_3^-\quad E^0 = 0.15V \qquad (9)$$

This reaction may be aided by catalysts placed on the sparger and/or in the solution chamber itself. The catalysts may be homogeneous or heterogenous as desired to maximize the efficiency of the system. The ability of air to oxidize a given species is determined by pH, and concentrations as well as catalysts, temperature and pressure. Therefore, under proper conditions certain couples may be oxidizable even though the standard potentials indicate that may not be possible. Electrochemical calculations and diagrams such as Pourbaix or predominance area diagrams should be consulted. It should be noted that often peroxide ion is an intermediate in such reactions and this limits the actual oxidizing ability of air. However, in other solvents such as ammonia, peroxide formation is more common and completely different couples become available for use.

Fewer materials are suitable for this function than for use in the primary cell, since the material has to be regenerated by oxygen. The Fe(III)/Fe(II) couple (complexed for solubility in basic medium or a pumpable slurry) and other transition metals, chromate/Cr(III), Mn(II)/Mn(III), Sn(IV)/Sn(II), Co(II)/Co(III) catalyzed by activated charcoal in the sparging chamber can be used. Also, chlorate/chlorite etc. can be used.

The solution generated in equation (9) may then be circulated into the cathode chamber and the net reaction (for the iodate/iodide couple) will occur in the Electroconversion Cell.

$$3\ BH_4^- + 4\ IO_3^- \rightarrow 3\ BO_2^- + 4\ I^- + 6\ H_2O\ \ E^0 = 1.50V \quad (10)$$

Since the solution is constantly being recirculated, only a small amount of fluid—just enough to provide for maximum flow rates—need be in the tank 4. The net reaction is still that in reaction (3) except that the reaction voltage is 1.50 V instead of 1.65 V. Using this particular intermediary results in an approximate 9% loss in available energy due to reduction in voltage being delivered. This energy is of course generated as heat in reaction (9) and is the lost 0.15 volts.

This embodiment is useful in situations where a high specific energy air breathing design is desired but also a very high peak power system is also desired. In the air breathing configurations in FIGS. 3 and 4 the peak power is limited by the surface area of the air breathing electrode, (among other things). Since there may be design and cost constraints on using a direct air breathing electrode, this embodiment allows a design for very high air input rates (it may even be compressed) to allow for high power. Another advantage to this configuration is a substantially reduced response time. Since both the anolyte and catholyte may be stored in their respective tanks when a high power demand is quickly required (e.g., the depressing of an accelerator pedal in an electric car) both liquid flow rates can be quickly increased into the cell. This embodiment is also useful when a bipolar cell and a net air consuming system is desired together. This embodiment would eliminate the need to distribute air to all the cathodes in the bi-polar cell.

Another embodiment of the Electroconversion Cell would be to have a main cell system as in FIG. 3 or 4 that as a direct air breathing electrode to provide the bulk of the energy at the highest efficiencies and also have another system as in FIG. 5 that uses the sparging chamber to oxidize another compound to provide the necessary peak power as required. In this embodiment the sparging unit (4) as shown in FIG. 5 could (but doesn't necessarily have to) be smaller than the air electrode unit. The designer then can avoid building a very large surface area air breathing electrode to do the entire job on its own. The result is an overall smaller system with equivalent performance (specific energy verses specific power). The borohydride solution to feed the two cells may be drawn out of the same tank or different tanks as desired in this embodiment.

In these embodiments, a second set of electrodes for recharging may be used to recharge the fluid. Of course the option to drain tank 2 and fill tank 1 is still part of this embodiment.

An additional flexibility offered by this system is that, in any flow cell with varying power outputs and flow rates, normally all of the borohydride in the solution is not completely converted as it passes through the cell. Consequently even though tank 1 may be nearly empty, as an emergency reserve, the used liquid in tank 2 could be pumped up to tank 1 (through the recharge cell if it is there or just a pipe) to provide an emergency reserve. Since the borohydride concentration would be low, degraded performance would be expected but a motorist may still be able to get to that recharge station.

An additional advantage of these configurations is that determining the remaining energy is simply a function of how much fresh solution remains in tank 1. Accurate measurements of the energy left in multiple batteries is more difficult.

Figure 6:
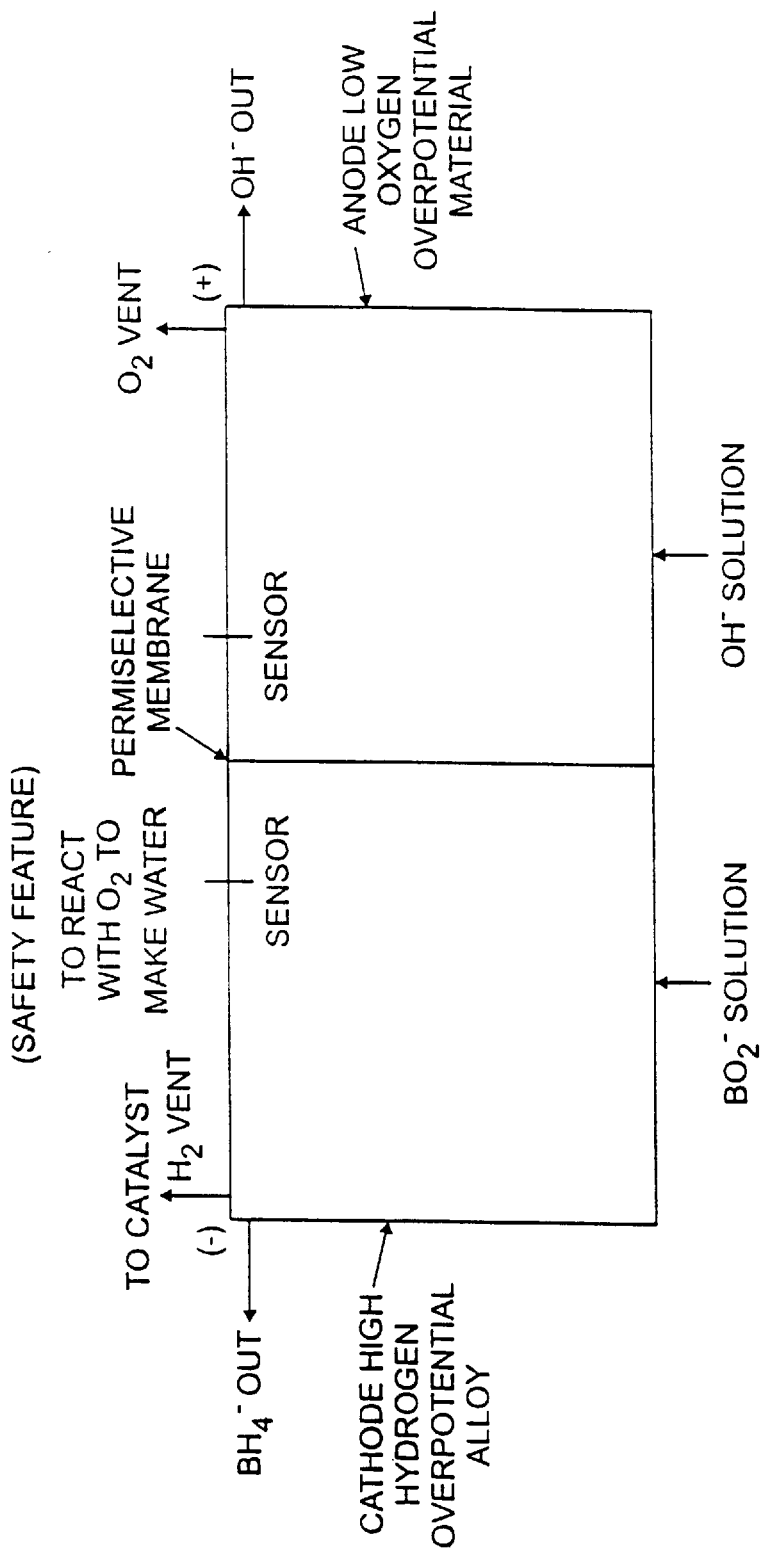
FIG. 6 is a diagrammatic representation of a cell used to recharge a discharged borohydride cell or to generate borohydride electrochemically.

FIG. 6 shows the recharging cell. Although this cell may actually be the same cell as cell 2 the flexibility allowed with this system permits the two cells to be separate. During recharge equation (3) will be reversed to produce borohydride and oxygen gas as follows:

$$BO_2^- + 2\ H_2O \rightarrow BH_4^- + 2\ O_2\ \ E^0 = -1.65V \quad (11)$$

The negative voltage indicates that electricity must be put in to drive the reaction in the direction shown. Certain important conditions are required to allow this reaction to proceed efficiently. At such negative a voltages it is easier to dissociate water into hydrogen and oxygen. Fortunately, the oxygen is a desired product. Releasing gases from physical electrodes is a process which is extremely dependent on both the composition and the physical characteristics of the electrode. The release of oxygen from a basic solution of water is the reverse of equation (2)

$$8\ OH^- \rightarrow 2\ O_2 + 4\ H_2O + 8\ e^-\ \ E^{1/2} = -0.401V \quad (12)$$

In reviewing the above discussion of theoretical voltages, it should be kept in mind that the actual voltage required to release the free gas is higher than theoretical. The difference between the theoretical voltage and the actual voltage required is referred to as the overpotential (or overvoltage). In the case of an oxygen-releasing electrode this potential is referred to as the oxygen overpotential. Likewise with the hydrogen electrode it is called the hydrogen overpotential. The overpotential is dependent on both the gases evolved and the electrode material. Further, high current densities and lower temperatures favor higher overpotentials.

A low oxygen overpotential electrode is desired to maximize the efficiency of reaction (12). Materials with low oxygen overpotentials are gold, iridium oxide, manganese dioxide among others that are well known in the industry. These electrodes may be made of base metal materials such as stainless steel and coated with the desired material.

Producing the borohydride requires the reverse of reaction 1 which is $$BO_2^- + 6\ H_2O + 8\ e^- \rightarrow BH_4^- + 8\ OH^-\ \ E^{1/2} = -1.24V \quad (13)$$

At such a negative voltage, the release of hydrogen from water is more favorable as follows $$2\ H_2O + 2\ e^- \rightarrow H_2 + 2\ OH^-\ \ E^{1/2} = 0.8277 \quad (14)$$

If reaction (14) proceeds instead of Reaction (13) the cell will not recharge and energy is being wasted. Therefore in order to insure that reaction (13) proceeds, an electrode with a high hydrogen overpotential is required for the recharge side of the cell. An overpotential of at least the difference in voltages between reactions (13) and (14), 0.4123 V, will be required and higher overpotentials are desirable so as to minimize reaction (14) as much as possible. Soft metals have a tendency to have high hydrogen overpotentials. Mercury for example has been used for many decades to recover sodium metal ($E^{1/2} = -2.7$ V) from aqueous solutions to produce sodium hydroxide. Mercury of course is a liquid and would also have environmental considerations. However, mercury liquid or a coating on the surface of another metal would work to allow reaction (14) to proceed at high efficiency and is considered an embodiment of the Electroconversion Cell. Other soft metals which are solid are also within the scope of the Electroconversion Cell. These would include but are not limited to Bismuth, lead, tin, thallium, cadmium, gallium and indium. Various alloys of these metals exhibit very high overpotentials. Tellurium poisons the ability of an electrode to form hydrogen gas and can be incorporated as the free element or as a telluride of the other metals listed above. The innumerable combination of alloys available allows designers to chose the material based on hydrogen overpotential, corrosion resistance to the different environments, cost and mechanical qualities just to mention some of the parameters. As can be readily seen the optimal recharging cell would have a high surface area (and therefore low current density) anode coated with gold or iridium oxide. The cathode would have a smaller (higher current density) electrode coated with a soft metal alloy. While it is possible to design a single cell that can efficiently charge and discharge, the Electroconversion Cell frees the designer to make use of yet another option (that of choosing between two cells or one) to produce an elegant solution for a given application.

It should be noted that by necessity any rechargeable battery represents an electrochemical synthesis of the reactants. Borohydride salts are useful chemical agents and are widely used in the chemical industry as reducing agents. The cost of production by current methods is high since borohydride is made by reaction sodium hydride with either boron trifluoride or boric esters of organic alcohols. Large quantities of by-products are produced which must be separated from the borohydride. In contrast the production of borohydride from cheap borates and even borax and electricity represents a significant improvement in production costs and could even spur a "borohydride economy" where an infrastructure arises to distribute energy for electric utilities for example, or hydrogen to a refinery for example (borohydride releases hydrogen gas under a variety of conditions) or borohydride solution for vehicles as an easily pumpable and storable solution of borohydride.

The electrodes made out of these alloys and the reaction (13) represent novel materials for use in the electrochemical synthesis of borohydrides.

These electrodes may also be used in any reduction where a high hydrogen overvoltage is required. Materials such as titanium, vanadium, other transition metals as well as the rare earth metals may be recovered from aqueous solutions using these electrodes as cathodes in an electrochemical plating type of operation. Methods for producing these materials generally rely on the reduction of anhydrous chlorides with an active metal such as magnesium or sodium. Vanadium is reduced from its oxides and aluminum in a thermite type of reaction. All these methods are expensive and have problems of recovering the metal from a fused salt matrix. These electrodes may also be used in any electrochemical synthesis where a high reduction potential is desired. Organic compounds may be reduced electrically with cheap water as a proton source for example.

The synthesis of borohydride from borates is relatively clean and efficient. The products are oxygen, and the borohydride. A small amount of hydroxide will be present but this is beneficial as the basic conditions stabilize the solution. For energy and most other uses the hydroxide may remain. If the recovery of the dried product is required it may be separated from the borohydride by one of several existing methods.

The cheap availability of borohydride allows the solutions to be pumped from one location to another where it may be converted back to electricity. The borohydride can also be a very safe and cheap method of transporting hydrogen. As an example refineries today are often net users of hydrogen. Borohydride solution could be transported (via pipeline, barge, rail or road, etc.) to a site requiring hydrogen. If the solution is acidified or catalyzed by a transition metal catalyst such as cobalt, hydrogen is released:

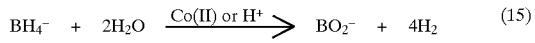

$$BH_4^- + 2H_2O \xrightarrow{Co(II) \text{ or } H^+} BO_2^- + 4H_2 \quad (15)$$

Reaction 15 releases large quantities of hydrogen. If a 44% w/w solution of borohydride is acidified one liter of solution will release about 116.3 grams of hydrogen. This is more hydrogen than available from other sources of hydrogen. Even cryogenic liquid hydrogen only has a density of 70 grams per liter. Hydrogen pressurized to 6000 psi has a density of only 36 grams per liter. Hydrogen stored in alloys such as rare-earth-nickel alloys store about 1% hydrogen by weight. This times the density of the alloy gives densities slightly higher than liquid hydrogen but less than borohydride solution. In any event the alloys are very expensive and not as easily handled as a liquid. The borohydride solution is also easier and safer to handle than liquid or high pressure hydrogen An even higher density is available if the borohydride is handled as the solid or as a pumpable slush or a higher temperature solution at about 80 to 90% by weight. Thereby doubling the amount of hydrogen available to over 200 grams per liter. This is 2240 liters of hydrogen from one liter of material delivered. (Some water would need to be added at the site). This is over 79 scf of hydrogen gas from one liter of material. To store hydrogen gas at this density a system operating at almost 33,000 psi would be required. (That pressure is typical of the pressure developed inside a rifle barrel as it is fired)

The spent liquid is a solution of borate which can be sent back to the regenerating facility and converted back to borohydride by adjusting the pH if necessary, and electrolyzing in a cell to synthesize borohydride, essentially providing a closed loop with electricity and water as the reactants and hydrogen and oxygen as the products. The energy required to do this is still favorable as opposed to transporting the electricity a great distance due to line losses. It is also competitive with converting the borohydride to electricity first and using this electricity to generate hydrogen since available electrolysis cells only operate at about 70 to 75% efficiency. Therefore if the goal of the transport is to actually end up with hydrogen gas as a feedstock then the direct catalytic reaction in equation (15) is reasonable. If the goal of transport is to transport electricity as a final product then direct conversion of the borohydride in an Electroconversion according to equation (1) would be more suitable.

Figure 7:
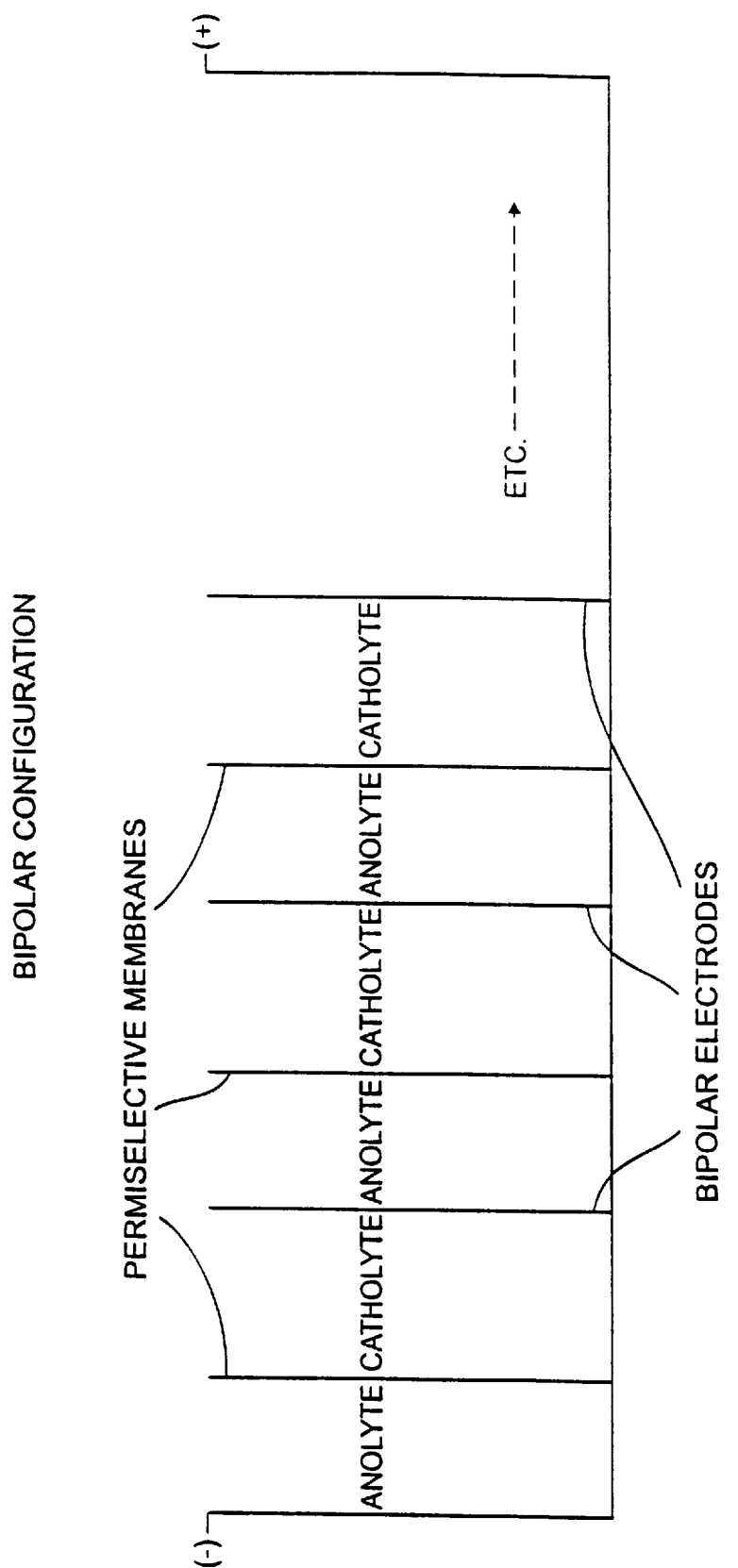
FIG. 7 is a diagrammatic representation of a system of bipolar electrodes.

As mentioned earlier several applications may require dealing in higher voltages than the cell voltage. When a bipolar cell is desired it can be made using the chemistry of this invention and is schematically shown in FIG. 7. The cell can be used either in a capacity to generate electricity or as a device for synthesizing borohydrides. In FIG. 7 the bipolar arrangement consists of a bipolar electrode,the anolyte, permiselective membrane, catholyte. The sequence then repeats. Each sequence represents a cell. (the two end electrodes are not bipolar but regular with only one face in contact with electrolyte.) The battery can be sealed and can be rechargeable or not as desired. The battery can be flow through, which would require a manifold to distribute the electrolyte to each chamber. If it is a direct air breather air would also need to be distributed to each cathode chamber as well.

Note that in all the electrodes shown and in contrast to many conventional electrodes, the electrode itself is not part of the electrochemistry, and the materials that the electrode are made of do not change in chemical composition. As a result, electrode life and ease of design are improved. Even though the materials of the electrode may enhance the chemistry taking place, the electrode itself does not change.

FIGS. 8A–8D show various type of bipolar electrodes that would be useful in various applications. These electrodes are by no means limiting of the many possibilities. FIG. 8 A shows a simple plate which acts only as an electron collector. It may be used in a configuration as shown in FIG. 5 where the air is sparged into a separate chamber and this liquid is delivered to each cathode chamber. The borohydride solution is manifolded into each anode chamber to operate the system. Of course a sealed system as shown in FIG. 2 could also be configured in a bipolar mode with the electrode shown in FIG. 8 A.

The electrode in FIG. 8 B shows one side of the electrode as an air breather. These electrodes require high surface area are usually catalyzed and would also require space for the catholyte.

The electrode in FIG. 8 C shows a bipolar electrode which is more optimized for the recharging cell or cell made for manufacturing borohydrides. This electrode is coated with a high hydrogen overvoltage material on the side of the cell that faces the borate/borohydride solution. The other side of the electrode has a low oxygen overpotential material coated on the side facing the oxidizer side of a cell. This electrode would be suitable for either the recharge cells as depicted in FIG. 4 and 5 or as an electrode for the cell 2 in FIG. 5 or as the electrode for manufacturing borohydrides.

The electrode in FIG. 8 D is a combination electrode for use in the direct air breathing configurations. One side can be coated with a high hydrogen overvoltage material and faces the borate/borohydride solution. The other side has an air breathing electrode. This electrode could be used in a bipolar configuration of cell 2 in FIG. 3 and 4. It can also be used in the recharge cell 5 in FIG. 4 and 5. Since this recharge cell (5) is also the synthesis cell for manufacturing borohydrides this electrode would also be suitable for manufacturing borohydrides.

Further versatility results because many borohydride salts are significantly soluble in other solvents besides water. For instance the solubility of sodium borohydride in dimethylformamide at 20° C. is about 18% by weight. This increases at higher temperatures. If a cell needed to operate in an environment that was not suitable for water this solvent may be used instead. As mentioned earlier sodium borohydride is very soluble in anhydrous ammonia. This system would allow very low temperature operations as well as very specific energies. This system would also allow for instance the utilization of the extremely high solubility of materials such as ammonium nitrate as a high concentration oxidizer as the catholyte.

Complexing agents (such as crown ethers) or other agents that increase the solubility of a borohydride in any given solvent may also be used and are considered as coming under the scope of this invention.

Although permiselective membranes allow transfer of non-ionic materials across the membrane by osmotic pressure two different solvent systems may be incorporated in the same cell. As an example a dimethylformamide/borohydride solution could be the anolyte and a water sodium hydroxide solution could be the catholyte.

In yet another embodiment the permiselective membrane could be eliminated and two liquids which are not soluble in each other but can each dissolve the required electrolyte can form a cell. As an example sodium borohydride dissolved in water would be the anolyte. A halogen such as chlorine dissolved in a solvent such as chloroform could be the catholyte. A phase transfer catalyst (such as a quaternary ammonium halide salt, $R_4N^+X^-$) for transport of chloride across the barrier would be an option to provide conductivity.

Other Embodiments

Other embodiments are within the following claims.

What is claimed is:

1. An electrochemical storage medium comprising a carrier mixed with a borohydride compound, the borohydride compound being oxidizable to an oxidized boron-containing compound concurrent with the generation of an electric current, the storage medium being in electrical contact with an electrode for carrying current generated during that oxidation.

2. The storage medium of claim 1 in which the oxidized compound is a borate $(BO_2)^-$.

3. The storage medium of claim 1 in which the carrier is an aqueous solution.

4. The storage medium of claim 1 in which the carrier is a non-aqueous solution.

5. The storage medium of claim 4 in which the carrier is a non-aqueous solution comprising a liquid that dissolves the compound.

6. The storage medium of claim 5 in which the carrier is selected from the group consisting of: anhydrous ammonia; amines; non-amine organic bases; alcohols; alkene carbonates; and glycols.

7. The storage medium of claim 5 in which the carrier is selected from the group consisting of:

dimethylformamide; dimethylsulfoxide; tripropylamine; pyridine; quinoline; triethanolamine; monethanolamine; ethylene glycol; propylene glycol; methanol; ethanol; ethylene carbonate; and propylene carbonate.

8. The storage medium of claim 5 in which the non-aqueous solution comprises a solubilizer or a conductivity enhancer.

9. The storage medium of claim 5 in which the non-aqueous solution comprises an agent selected from the group consisting of EDTA, crown ethers, cryptates, and quaternary ammonium salts.

10. The storage medium of claim 1 positioned to be the anode of a battery.

11. A battery comprising an anode and a cathode in electrical communication, the anode comprising a carrier mixed with a borohydride compound, the borohydride compound being oxidizable to an oxidized boron-containing compound concurrent with the discharge of the battery.

12. The battery of claim 11 in which the oxidized compound is a borate $(BO_2)^-$.

13. The battery claim 11 in which the carrier is a solution.

14. The battery of claim 11 in which the carrier is an aqueous mixture.

15. The battery of claim 11 in which the carrier is a non-aqueous mixture.

16. The battery of claim 11 in which the cathode comprises a catholyte which includes an oxidizing agent.

17. The battery of claim 16 in which the oxidizing agent is selected from: air; $O_2$; compounds comprising oxygen and a halogen; and $X_2$, where X is a halogen.

18. The battery of claim 17 in which the oxidizing agent is perchlorate $(ClO_4^-)$, chlorate $(ClO_3^-)$, chlorite $(ClO_2^-)$, hypochlorite $(OCl^-)$, chlorine $(Cl_2)$, bromine $(Br_2)$, bromate $(BrO_3^-)$, or iodate $(IO_3^-)$.

19. The battery of claim 16 in which the oxidizing agent is a) $[MnO_4]^-$; b) $[FeO_4]^{-2}$; c) $CeOH(NO_3)_3$; d) $[Ce(NO_3)_6]^{-2}$; e) $[Fe(CN)_4]^{-3}$; f) $[CrO_4]^{-2}$; g) $[SnO_3]^{-2}$; h) $[BiO_3]^-$; i) $MnO_2$; j) $Ag_2O$; k) $AgO$; l) $CeO_2$; m) $PbO_2$; n) $NiO(OH)$; o) $NiO_2$; p) $CoO(OH)$; q) $[NO_3]^-$; r) $[NO_2]^-$; s) $[S_2O_8]^{-2}$; t) compounds containing Cu(III), Tl(III), Hg (II), Se (VI), or Te(VI); or u) $R(NO_2)_n$ where R is an alkyl, aryl, or arylakyl organic group and n=1–6.

20. The battery of claim 16 in which the oxidizing agent is trinitrobenzoic acid, hexanitrobenzene, or trinitrobenzene.

21. A battery as in claim 11 in which the anode comprises an anolyte, the cathode comprises a catholyte, and the anolyte and catholyte are separated by a permiselective membrane.

22. A battery as in claim 21 in which the membrane is an anionic membrane.

23. A battery as in claim 21 where the membrane is a cationic membrane.

24. A battery as in claim 21 where the membrane is bipolar.

25. A battery as in claim 11 where the cathode is an air breathing cathode.

26. A battery as in claim 11 which comprises a catholyte which can be oxidized by air to produce an agent that then oxidizes borohydride to borate with the generation of electrical current.

27. A battery as in claim 26 wherein the catholyte is reoxidized by air in a cycle after it has generated electricity by oxidizing the borohydride, thus allowing its reuse.

28. A battery as in claim 26 wherein the catholyte comprises of oxidizing agents that can be oxidized by air in basic solution.

29. A battery as in claim 28 wherein the catholyte contains iodate ($IO_3$) and $I^-$.

30. A battery as in claim 28 in which the catholyte contains ferricyanide and ferrocyanide.

31. A battery as in claim 28 in which the catholyte contains chromate and Cr+3.

32. A battery as in claim 28 in which the catholyte contains manganese at valence +2 and +3.

33. A battery claim 28 in which the catholyte contains tin at valence +2 and +4.

34. A battery as in claim 28 in which the catholyte contains Cobalt at valence +2 and +3.

35. A battery as in claim 28 in which the catholyte comprises a catalyst to aid the reoxidation of the oxidation agent to the higher oxidation state by air.

36. A battery as in claim 26 comprising a chamber separate from the cathode compartment in which reoxidation of the catholyte takes place.

37. A battery as in any one of claims 26–36 comprising two units, one that is the direct air breather, and another unit which comprises a catholyte which can be oxidized by air and can then oxidize borohydride to borate with the generation of electrical current.

38. A battery as in claim 11 or claim 26 which contains a bipolar electrode.

39. A battery as in claim 11 or claim 26, further comprising external storage tanks for storage of anolyte, catholyte or both anolyte and catholyte.

40. The battery of claim 11 or claim 26 comprising a cell which is used both to generate electricity from the oxidation of the borohydride and which is physically separated from a second cell for generating the borohydride from the oxidized compound.

41. The battery as in claim 11 or claim 26 comprising a cell which is used both to generate electricity from the oxidation of the borohydride and to generate the borohydride from the oxidized compound.

42. A battery as in claim 11 or claim 26 comprising a controller connected to at least one source of a reactant, the controller determining the transport of the reactant to the anode or the cathode, the battery further comprising a monitor to determine a battery characteristic and to produce a signal to the controller in response to monitored values of the characteristic.

43. A battery as in claim 42 where the monitor comprises at least one probe which generates an input signal responsive to a characteristic selected from the group consisting of ORP, conductivity, voltage, current and power output, ion concentration, pH, index of refraction, colorimetric, COD, turbidity and density, the input signal being transmitted to an electronic processor, the processor being connected to the controller which controls flow into a battery compartment.

44. A battery as in claim 11 or claim 26 which comprises an electrode comprising a conductive substrate which is coated.

45. A battery as in claim 11 or claim 26 which comprises an electrode, the electrode comprising a substance selected from the group consisting of: a) an alloy of bismuth, thallium, cadmium, tin, lead, gallium, or indium; b) mercury, mercury amalgamated with other metals, or mercury coated on a conductive substrate; c) tellurium or tellurides.

46. A battery as in claim 11 or claim 26 which comprises an electrode, the electrode comprising a material to enhance corrosion resistance.

47. A battery as in claim 45 in which the electrode comprises a material to enhance corrosion resistance.

48. The battery of claim 45 in which the electrode is a bipolar electrode comprising two sides, one of the sides being coated with said substance, and a second side being coated with a material of low oxygen overvoltage.

49. A battery as in claim 45 in which the electrode is a bipolar electrode having two sides, one of the sides being coated with said substance, and a second side having an air breathing electrode.

50. A battery as in claim 38 in which the bipolar electrode comprises a sheet of conductive material.

51. A battery as in claim 50 in which the conductive material is stainless steel or gold plated copper.

52. A battery as in claim 11 comprising an electrode having a surface whose texture is smooth.

53. A battery as in claim 11 configured as a sealed unit.

54. A battery as in claim 53 in which the battery is chosen from the group consisting of: a button for a hearing aid; AAA; A; B; C; D; 9 volt; a computer battery; and a cellular phone battery.

55. A battery as in claim 11 characterized by voltage and current production suitable for ignition and starter motor operation in a vehicle powered by an internal combustion engine.

56. A battery as in claim 11 or 26 in which at least one of the cells is configured to be suitable for installation on a vehicle that uses electricity either partially or entirely to propel the vehicle.

57. A battery as in claim 37 in which at least one of the cells is configured to be suitable for installation on a vehicle that uses electricity either partially or entirely to propel the vehicle.

58. A battery as in claim 11 or 26 configured to be suitable for storage of electricity for electric utility load leveling.

59. A battery as in claim 37 configured to be suitable for storage of electricity for electric utility load leveling.

60. The battery of claim 45 in which the electrode is a bipolar electrode comprising two sides, one of the sides being coated with said substance, and a second side being coated with gold or iridium oxide.

61. A battery as in claim 11 comprising an electrode having a high surface area.

62. The battery as in claim 61 in which the high surface area is foam metal, tubes, cylindrical fibers, or powder.

63. The battery as in claim 11 comprising a coated electrode.

64. A battery as in claim 11 comprising a catalyst to catalyze an electrochemical reaction.

65. The battery of claim 11 further characterized in that the battery is rechargeable when an electrical potential is applied to the anode to re-generate the borohydride compound from the oxidized boron-containing compound.

66. The battery of claim 11 or claim 65 further characterized in that the battery further comprises an inhibitor to inhibit release of hydrogen gas.

67. The batter of claim 66 in which the inhibitor comprises bismuth, thallium, cadmium, tin, lead, gallium, or indium.

68. The batter of claim 66 in which the inhibitor is mercury or mercury amalgamated with or coated on other metals.

69. The batter of claim 66 in which the inhibitor is tellurium or a telluride.

\* \* \* \* \*

EX PARTE REEXAMINATION CERTIFICATE (5642nd)

United States Patent
Amendola

(10) Number: US 5,804,329 C1
(45) Certificate Issued: Jan. 2, 2007

(54) ELECTROCONVERSION CELL

(75) Inventor: Steven Amendola, Ocean, NJ (US)

(73) Assignee: Millennium Cell, Inc., Eatontown, NJ (US)

Reexamination Request:
No. 90/006,999, Apr. 7, 2004

Reexamination Certificate for:
Patent No.: 5,804,329
Issued: Sep. 8, 1998
Appl. No.: 08/579,781
Filed: Dec. 28, 1995

(51) Int. Cl.
H01M 4/58 (2006.01)

(52) U.S. Cl. .......... 429/34; 429/105; 429/101; 429/210; 429/41

(58) Field of Classification Search .......... 429/101, 429/105, 210, 34, 41
See application file for complete search history.

(56) References Cited

U.S. PATENT DOCUMENTS

| | | | |
|---|---|---|---|
| 3,511,710 A | 5/1970 | Jung et al. | |
| 3,734,842 A | 5/1973 | Cooper | |
| 4,193,978 A | 3/1980 | Muller et al. | |
| 4,492,741 A | 1/1985 | Struthers | |
| 4,931,154 A * | 6/1990 | Hale et al. | 205/420 |

FOREIGN PATENT DOCUMENTS

| | | |
|---|---|---|
| DE | 1 180 433 | 10/1964 |
| GB | 1011076 | 11/1965 |
| GB | 1062094 | 3/1967 |
| JP | 48-36298 | 11/1973 |
| JP | 49-7699 | 2/1974 |
| JP | 4-026501 | 1/1992 |

OTHER PUBLICATIONS

Kubokawa et al. "Anodic Reaction of Sodium Borohydride at Porous Flow–Through Electrodes", translation of article, pp. 1–17.*

Indig, M.E. and Snyder, R.N., Sodium Borohydride, An Interesting Anodic Fuel (1), J. Electrochem. Soc., vol. 109, No. 11, pp. 1104–1106, Nov. 1962.

Kubokawa et al., "Anodic Reaction of Sodium Borohydride at Porous Flow–Through Electrodes", Electrochemistry; Department of Industrial Chemistry, Doshisha University, vol. 36, No. 11, pp. 788–792 and 826; Nov. 8, 1967.

Jasinski, "Fuel Cell Oxidation of Alkali Borohydrides", Electrochemical Technology, vol. 3, No. 1–2, pp. 40–43, 1965.

Oniclu et al., "Hydrazine Fuel–Cells", Revue Roumaine de Chimie, vol. 24, 1, pp. 145–152, 1979.

Heath, et al., "High Power Fuels Cells Undersea Applications", 9th Intersociety Energy Conversion Engineering Conference Proceedings, pp. 646–653, Aug. 26–30, 1974.

* cited by examiner

Primary Examiner—Laura Weiner

(57) ABSTRACT

Boron redox species can provide electrochemical cells for battery or energy storage systems that are characterized by favorable specific energy, energy density, capital and operating cost, recharge efficiency, safety, environmental impact, serviceability and longevity.

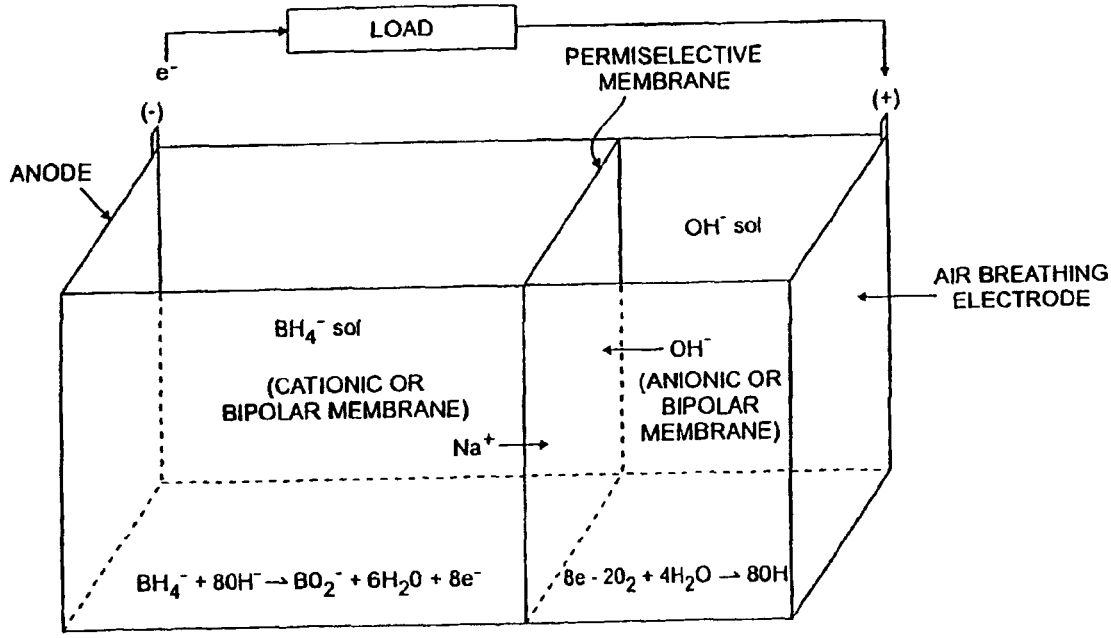

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2–4, 12, 15, 19, 21, 25, 27–28, 31, 35, 37, 44, 46, 47 and 52–65 are cancelled.

Claims 1, 5, 7–9, 11, 13–14, 16, 22–24, 26, 29, 30, 32–34, 38–42, 45 and 66–69 are determined to be patentable as amended.

Claims 6, 10, 17, 18, 20, 36, 43 and 48–51, dependent on an amended claim, are determined to be patentable.

New claims 70 and 71 are added and determined to be patentable.

1. An electrochemical storage medium comprising a *non-aqueous* carrier mixed with a borohydride compound, the borohydride compound being oxidizable to [an oxidized boron-containing] *a borate* compound concurrent with the generation of an electric current, the storage medium being in electrical contact with an electrode for carrying current generated during that oxidation.

5. The storage medium of claim [4] *1* in which the *borohydride compound is dissolved in the* carrier [is a non-aqueous solution comprising a liquid that dissolves the compound].

7. The storage medium of claim 5 in which the carrier is selected from the group consisting of:
[dimethylformamide;] dimethylsulfoxide, tripropylamine; pyridine; quinoline, triethanolamine, monethanolamine; ethylene glycol; propylene glycol; methanol, ethanol, ethylene carbonate, and propylene carbonate.

8. The storage medium of claim 5 in which the [non-aqueous solution] *carrier* comprises a solubilizer or a conductivity enhancer.

9. The storage medium of claim 5 in which the [non-aqueous solution] *carrier* comprises an agent selected from the group consisting of EDTA, crown ethers, cryptates, and quaternary ammonium salts.

11. A battery comprising an anode and a cathode in electrical communication,
the anode comprising *an anolyte comprising* a carrier mixed with a borohydride compound *and the cathode comprising a catholyte*, the borohydride compound being oxidizable to [an oxidized boron-containing] *a borate* compound concurrent with the discharge of the battery, *wherein the anolyte and catholyte are separated by a permiselective ion exchange membrane*.

13. The battery *of* claim 11 in which the *borohydride compound is dissolved in the* carrier [is a solution].

14. The battery of claim 11 in which the *borohydride compound is suspended in the* carrier [is an aqueous mixture].

16. The battery of claim 11 in which the [cathode comprises a] catholyte [which] includes an oxidizing agent.

22. A battery as in claim [21] *11* in which the membrane is an anionic membrane.

23. A battery as in claim [21] *11* where the membrane is a cationic membrane.

24. A battery as in claim [21] *11* where the membrane is bipolar.

26. A battery as in claim 11 [which comprises a] *wherein the* catholyte *includes an electrochemical couple* which can be oxidized by air [to produce an agent that then oxidizes borohydride to borate with the generation of electrical current].

29. A battery as in claim [28] *26* wherein the catholyte contains iodate ($IO_3$) and $I^-$.

30. A battery as in claim [28] *26* in which [the catholyte contains] *said couple is* ferricyanide and ferrocyanide.

32. A battery as in claim [28] *26* in which [the catholyte contains manganese at valence +2 and +3] *said couple is Mn(II)/Mn(III)*.

33. A battery *as in* claim [28] *26* in which [the catholyte contains tin at valence +2 and +4] *said couple is Sn(II)/Sn(IV)*.

34. A battery as in claim [28] *26* in which [the catholyte contains Cobalt at valence +2 and +3] *said couple is Co(II)/Co(III)*.

38. A battery as in claim 11 [or claim 26] which contains a bipolar electrode *having a first and second side*.

39. A battery as in claim 11 [or claim 26,] further comprising *at least one* external storage [tanks] *tank* for storage of anolyte, catholyte or both anolyte and catholyte.

40. The battery of claim 11 [or claim 26] comprising a cell which is used both to generate electricity from the oxidation of the borohydride *compound* and which is physically separated from a second cell for generating the borohydride *compound* from the [oxidized] *borate* compound.

41. The battery as in claim 11 [or claim 26] comprising a cell which is used both to generate electricity from the oxidation of the borohydride *compound* and to generate the borohydride *compound* from the [oxidized] *borate* compound.

42. A battery as in claim 11 [or claim 26] comprising a controller connected to at least one source of a reactant, the controller determining the transport of the reactant to the anode or the cathode, the battery further comprising a monitor to determine a battery characteristic and to produce a signal to the controller in response to monitored values of the characteristic.

45. A battery as in claim 11 [or claim 26] which comprises an electrode, *wherein* the electrode [comprising] *is* a substance selected from the group consisting of: a) [an alloy] *alloys* of bismuth, thallium, cadmium, tin, lead, gallium, or indium; b) mercury, mercury amalgamated with other metals, or mercury coated on a conductive substrate, *and* c) tellurium or tellurides.

66. The battery of claim 11 [or claim 65] further characterized in that the battery further comprises an inhibitor to inhibit release of hydrogen gas.

67. The [batter] *battery* of claim 66 in which the inhibitor comprises bismuth, thallium, cadmium, tin, lead, gallium, or indium.

68. The [batter] *battery* of claim 66 in which the inhibitor is mercury or mercury amalgamated with or coated on other metals.

69. The [batter] *battery* of claim 66 in which the inhibitor is tellurium or a telluride.

70. *The storage medium of claim 1, wherein the borohydride compound is suspended in the carrier.*

71. The battery of claim 16 in which the oxidizing agent is selected from the group consisting of $[MnO_4]^-$; $[FeO_4]^{-2}$; $CeOH(NO_3)_3$; $[Ce(NO_3)_6]^{-2}$; $[Fe(CN)_4]^{-3}$; $[CrO^4]^{-2}$; $SnO_3]^{-2}$; $[BiO_3]^-$; $MnO_2$; $Ag_2O$; $AgO$; $CeO_2$; $PbO_2$; $NiO(OH)$; $NiO_2$; $CoO(OH)$; $[NO_3]^-$; $[NO_2]^-$; $[S_2O_8]^{-2}$; compounds containing Cu(III), Tl(III), Hg(II), Se(VI), or Te(VI); and an organonitro compound of formula $R(NO_2)_n$ where R is an alkyl, aryl, or arylakyl organic group and n is 1–6.

* * * * *